United States Patent
Srinivas et al.

(10) Patent No.: US 7,359,333 B1
(45) Date of Patent: Apr. 15, 2008

(54) APPROACH FOR MANAGING INTERNET PROTOCOL TELEPHONY DEVICES IN NETWORKS

(75) Inventors: Muktevi Srinivas, Bangalore (IN); Jagannathan Shiva Shankar, Bangalore (IN); Damodar Patakolusu, Bangalore (IN); Prashant Hegde, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1067 days.

(21) Appl. No.: 10/167,090

(22) Filed: Jun. 10, 2002

(51) Int. Cl.
*G06F 11/00* (2006.01)
*H04L 9/00* (2006.01)

(52) U.S. Cl. ............... 370/252; 713/162
(58) Field of Classification Search ........... 370/469, 370/353–356
See application file for complete search history.

(56) References Cited

U.S. PATENT DOCUMENTS

| | | | |
|---|---|---|---|
| 5,754,552 A | 5/1998 | Allmond et al. | |
| 5,828,864 A | 10/1998 | Danknick et al. | |
| 5,923,663 A | 7/1999 | Bontemps et al. | |
| 5,940,589 A * | 8/1999 | Donovan et al. | 726/4 |
| 6,496,483 B1 * | 12/2002 | Kung et al. | 370/252 |
| 6,687,245 B2 * | 2/2004 | Fangman et al. | 370/356 |
| 6,745,333 B1 * | 6/2004 | Thomsen | 726/23 |
| 6,958,992 B2 * | 10/2005 | Lee et al. | 370/352 |
| 7,016,682 B2 * | 3/2006 | Won et al. | 455/445 |
| 7,020,778 B1 * | 3/2006 | Miettinen et al. | 713/182 |
| 7,085,936 B1 * | 8/2006 | Moran | 726/5 |
| 7,234,163 B1 * | 6/2007 | Rayes et al. | 726/22 |
| 7,237,264 B1 * | 6/2007 | Graham et al. | 726/23 |
| 7,272,846 B2 * | 9/2007 | Williams et al. | 725/111 |
| 2002/0141352 A1 * | 10/2002 | Fangman et al. | 370/254 |
| 2003/0043853 A1 * | 3/2003 | Doyle et al. | 370/489 |
| 2003/0208571 A1 * | 11/2003 | Yik et al. | 709/223 |
| 2003/0227903 A1 * | 12/2003 | Watson | 370/352 |
| 2005/0180403 A1 * | 8/2005 | Haddad et al. | 370/352 |
| 2006/0037075 A1 * | 2/2006 | Frattura et al. | 726/22 |
| 2007/0044141 A1 * | 2/2007 | Lor et al. | 726/3 |
| 2007/0067823 A1 * | 3/2007 | Shim et al. | 726/2 |

* cited by examiner

*Primary Examiner*—Kwang Bin Yao
*Assistant Examiner*—Warner Wong
(74) *Attorney, Agent, or Firm*—Hickman Palermo Truong & Becker LLP

(57) ABSTRACT

An approach for managing IP telephony devices in a network generally involves associating physical and logical data with an IP telephony device using identification data that identifies the IP telephony device. The physical data specifies one or more attributes of how the IP telephony device is connected to the network, for example, as a switch address, port, or both. The logical data specifies one or more logical attributes of the IP telephony device on the network, for example, an extension number or IP address. Correlating physical and logical data with an IP telephony device using identification data aids in identifying suspect IP telephony devices in a network by identifying IP telephony devices that have physical data, but no logical data and also IP telephony devices that have the same identification data, such as the same media access control layer address.

28 Claims, 3 Drawing Sheets

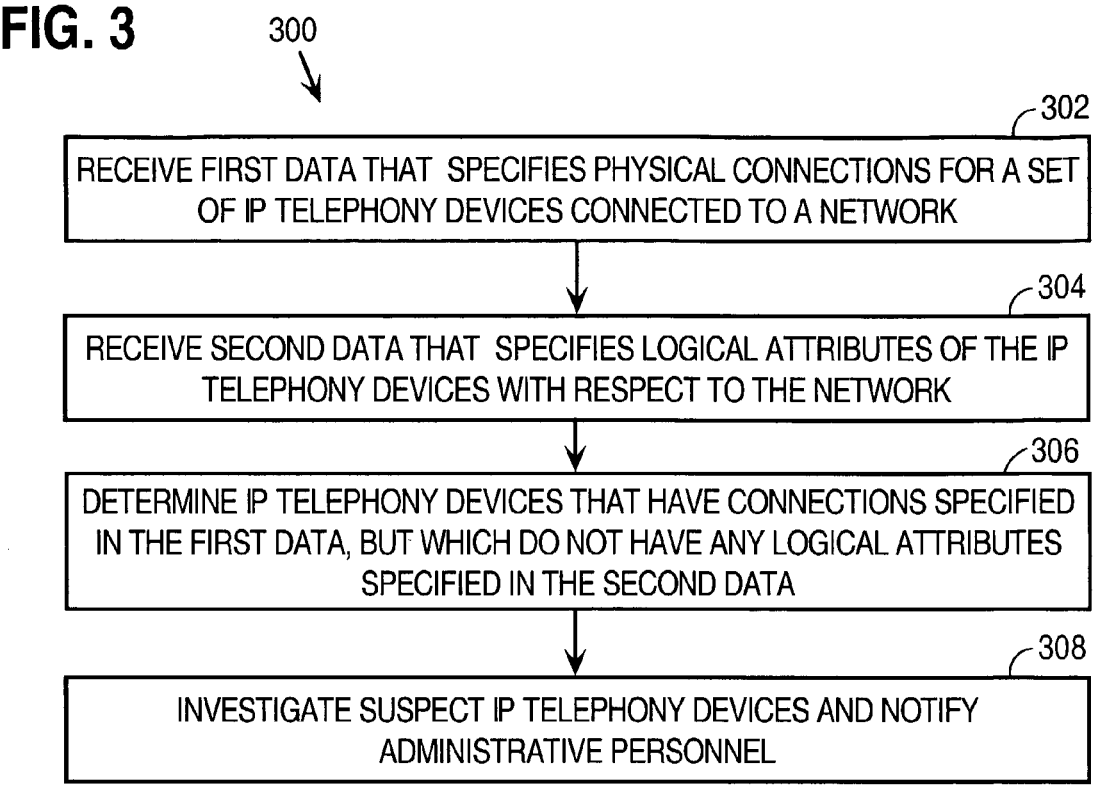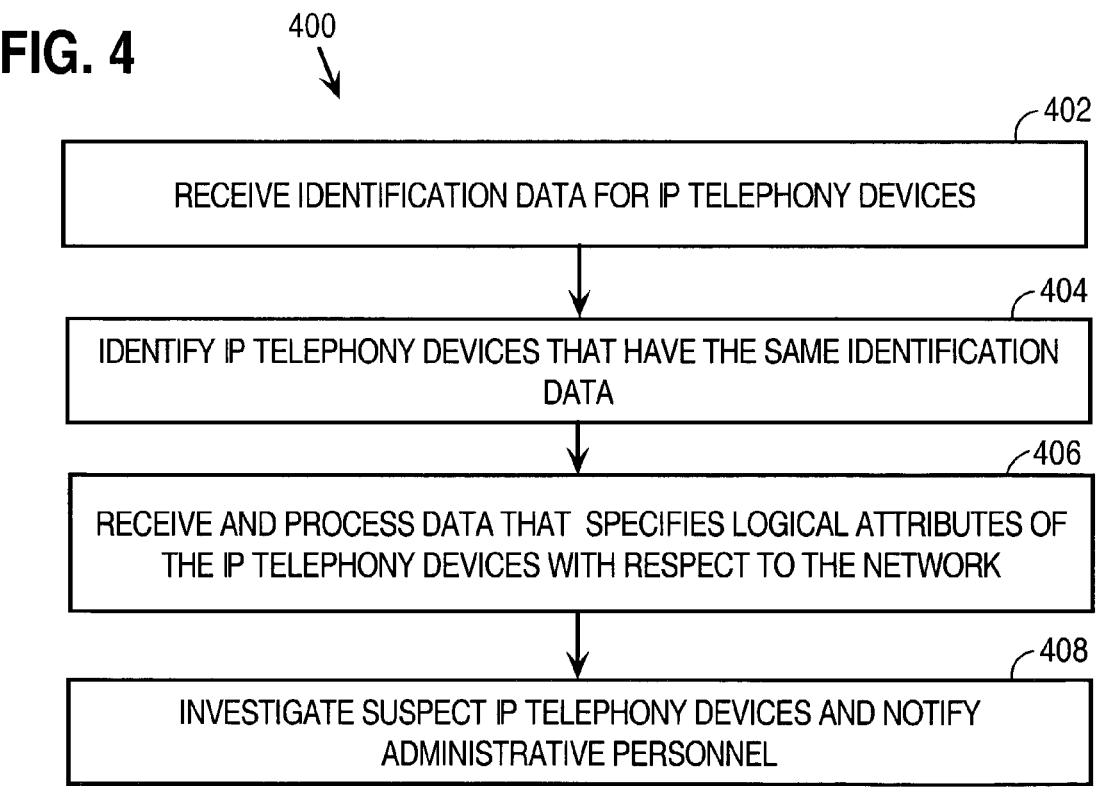

APPROACH FOR MANAGING INTERNET PROTOCOL TELEPHONY DEVICES IN NETWORKS

FIELD OF THE INVENTION

This invention relates generally to Internet Protocol (IP) telephony, more specifically, to an approach for managing IP telephony devices in networks.

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

IP telephony is a technology that allows voice telephone calls to be made over the worldwide packet data communications network known as the "Internet" without traversing the traditional public switched telephone network (PSTN). The increased availability of low cost Internet access and inexpensive IP telephony devices make using the Internet for telephone calls particularly attractive for end users. Moreover, aside from the cost of Internet access, transmitting data over the Internet is free for end users.

Because of the benefits of IP telephony, some business organizations have installed IP telephones ("IP phones") that use a business organization's intranet for internal calls and the Internet for external calls. Each IP phone is a node on the network and has its own IP address and Media Access Control (MAC) layer address. A call manager manages calls in a manner similar to the way a switch manages calls in a conventional private branch exchange (PBX) and PSTN arrangement.

IP phone arrangements provide several advantages over conventional PBX arrangements. First, business organizations can use their existing broadband Internet access to make external calls, so additional Internet access connections are generally not required. Second, recurring costs can be significantly lower in IP phone arrangements since local and long distance telephone service charges are avoided completely. Although there is a capital expense required to purchase the IP phones, the long-term savings can easily exceed this expense. Third, IP phones are very mobile since the phone extension and privileges are associated with the physical IP phone, instead of a physical connection. Thus, IP phones can be physically moved within an organization and the IP phones retain their phone extensions and privileges.

Despite the advantages provided by IP phone arrangements over conventional PBX arrangements, IP phone arrangements do have some drawbacks. One problem is the difficulty in managing additions, deletions and changes to IP phones in large enterprise deployments that may have hundreds, or even thousands of IP phones. Currently, network administrators do not have centralized access to both the physical and logical data for IP telephony devices. The physical data specifies connection attributes of IP phones to a network, such as a switch address or port. The logical data specifies logical attributes of IP phones with respect to the network, such as extension numbers and IP addresses. Thus, physical and logical data must be manually maintained and updated, which can become infeasible in large IP telephony deployments.

Another problem is that large IP telephony deployments are more susceptible to being "hacked" by devices that have connectivity to the particular network and that "spoof" the MAC address of legitimate IP phones. Such devices are sometimes referred to as "phantom" phones. Without centralized tracking of IP telephony devices, network administrators have greater difficulty in identifying suspect IP telephony devices.

Based upon the foregoing, there is a need for an approach for managing IP telephony devices in networks that does not suffer from limitations in prior approaches. There is a further need for an approach for managing IP telephony devices in networks in a manner that includes both physical data and logical data for IP telephony devices. There is also a need for an approach for managing IP telephony devices in networks that provides for identification of suspect IP telephony devices.

SUMMARY OF THE INVENTION

According to one aspect of the invention, an approach is provided for managing data in a communications network. According to this approach, first data is received that specifies a physical connection attribute of an Internet Protocol (IP) telephony device to the communications network. Second data is received that specifies a logical attribute of the IP telephony device with respect to the communications network. Both the first data and the second data are associated with the IP telephony device based upon identification data that identifies the IP telephony device.

According to another aspect of the invention, an approach is provided for managing data in a communications network. According to this approach, first data is received that specifies a physical connection attribute of an Internet Protocol (IP) telephony device to the communications network. If, based upon identification data that identifies the IP telephony device, second data is not available that specifies a logical attribute of the IP telephony device with respect to the communications network, then status data is generated that indicates that the second data is not available for the IP telephony device.

According to yet another aspect of the invention, an approach is provided for identifying a suspect Internet Protocol (IP) telephony device on a communications network. In this approach, first identification data that identifies a first IP telephony device on the communications network is compared to second identification data that identifies a second IP telephony device on the communications network. If the first identification data is the same as the second identification data, then status data is generated that indicates that the first and second IP telephony devices are suspect devices.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a flow diagram that depicts an approach for determining suspect IP telephony devices in a network.

FIG. 4 is a flow diagram that depicts another approach for determining suspect IP telephony devices in a network.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ADMINISTRATIVE APPLICATIONS
III. AUTHENTICATION AND SECURITY
IV. IMPLEMENTATION MECHANISMS

I. Overview

An approach for managing IP telephony devices in a network generally involves associating physical and logical data with a IP telephony device using identification data that identifies the IP telephony device. The physical data specifies one or more attributes that define how the IP telephony device is connected to the network, for example, a switch address, port, or both. The logical data specifies one or more logical attribute of the IP telephony device with respect to the network, for example, an extension number or IP address. As described in more detail hereinafter, associating physical and logical data with an IP telephony device using identification data aids in identifying suspect IP telephony devices in a network.

Figure 1:
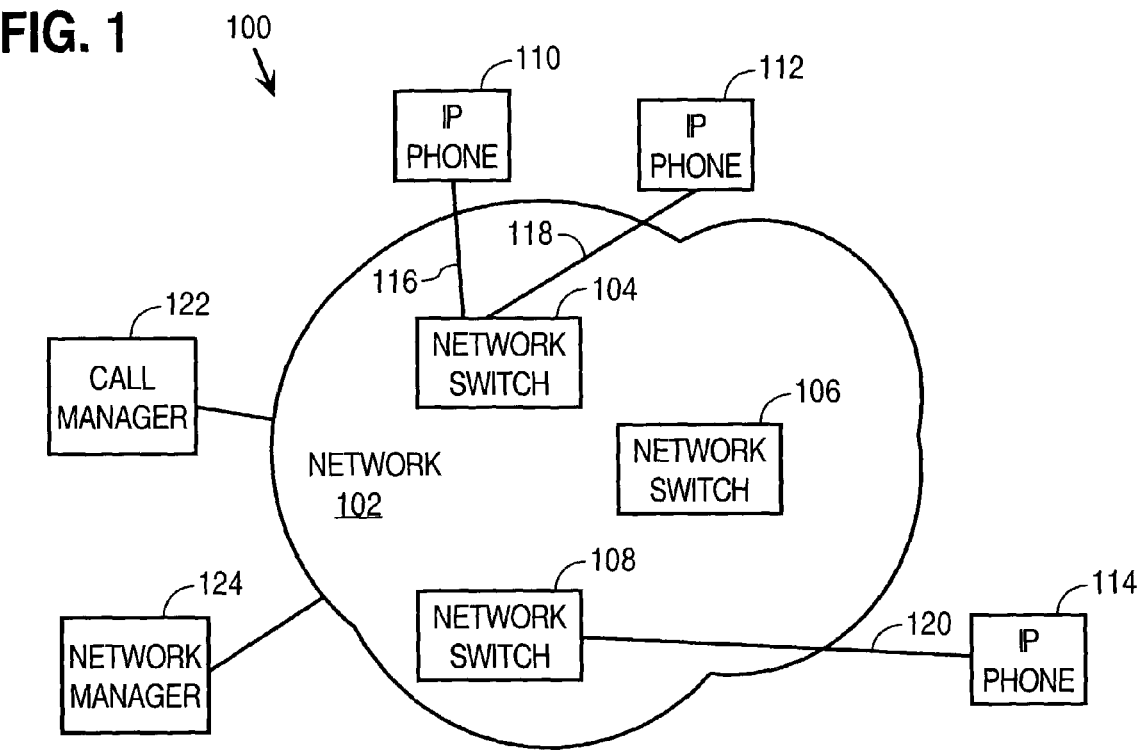
FIG. 1 is a block diagram that depicts a network and a network manager for managing IP telephony devices in a network.

FIG. 1 is a block diagram of a network arrangement 100 on which embodiments of the invention may be implemented. Network arrangement 100 includes a network 102 that includes network switches 104, 106, 108. Network 102 may be any type of network and the invention is not limited to any particular type of network. Examples of network 102 include, without limitation, the Internet, a Wide Area Network (WAN), a Local Area Network (LAN), any type of enterprise network, or any combination of the foregoing. Network switches 104, 106, 108 may be any type of network switch depending upon the requirements of a particular application. Examples of network switches 104, 106, 108 include, without limitation, layer 2 and layer 3 switches. Network 102 may include other components that are not depicted in FIG. 1 for purposes of explanation. Examples of other components that may be included in network 102 include, without limitation, other switches, routers, hubs and gateways.

Network arrangement 100 also includes IP phones 110, 112, 114 that are communicatively coupled to network switches 104, 106, 108. As depicted in FIG. 1, IP phones 110, 112 are communicatively coupled to network switch 104 via links 116, 118, respectively. IP phone 114 is communicatively coupled to network switch 108 via link 120.

Links 116, 118, 120 may be implemented by any medium or mechanism that provides for the exchange of data between IP phones 110, 112, 114 and their respective network switches 104, 106, 108. Examples of links 116, 118, 120 include, without limitation, a network such as a Local Area Network (LAN), Wide Area Network (WAN), Ethernet or the Internet, or one or more terrestrial, satellite or wireless links. For purposes of brevity, links 116, 118, 120 are depicted in FIG. 1 as direct connections between IP phones 110, 112, 114 and their respective network switches 104, 106, 108. However, links 116, 118, 120 do not have to be physically direct links and may involve connections through any number of network elements, for example network switches, hubs and routers that are not depicted in FIG. 1.

Network arrangement 100 includes a call manager 122 that manages IP phones 110, 112, 114 and telephone calls made over network 102. For example, call manager 122 assigns and manages extensions and IP addresses for IP phones 110, 112, 114. Thus, call manager 122 manages the logical aspects of IP phones 110, 112, 114 and maintains logical data that specifies the logical attributes of IP phones 110, 112, 114. An example of a suitable call manager 124 is Cisco CallManager, from Cisco Systems, Inc., San Jose, Calif.

Network arrangement 100 also includes a network manager 124 that performs various administrative functions associated with network 102. According to one embodiment, network manager 124 is configured to associate physical and logical data with a particular IP phone based upon identification data that uniquely identifies the particular IP phone. The identification data may be any type of data that uniquely identifies an IP phone and the invention is not limited to any particular type of identification data. Identification data may be permanently associated with an IP phone. Examples of permanently-associated identification data include, without limitation, an identifier, CPU serial number, code or signature, such as a MAC address, or a static IP address, embedded in the hardware or firmware of an IP phone.

Another example of identification data is a signature of an IP phone determined based upon one or more physical attributes of the IP phone. Identification data may also be established during an initial configuration of an IP phone and thereafter stored in the IP phone. For example, call manager 122 may identify and retrieve the logical data for IP phone 110 based upon the MAC address of IP phone 110. In this situation, the logical data for IP phone 110 may specify the extension of IP phone 110. Logical data may also be stored in association with identification data to provide convenient location and retrieval of the logical data.

Figure 2:
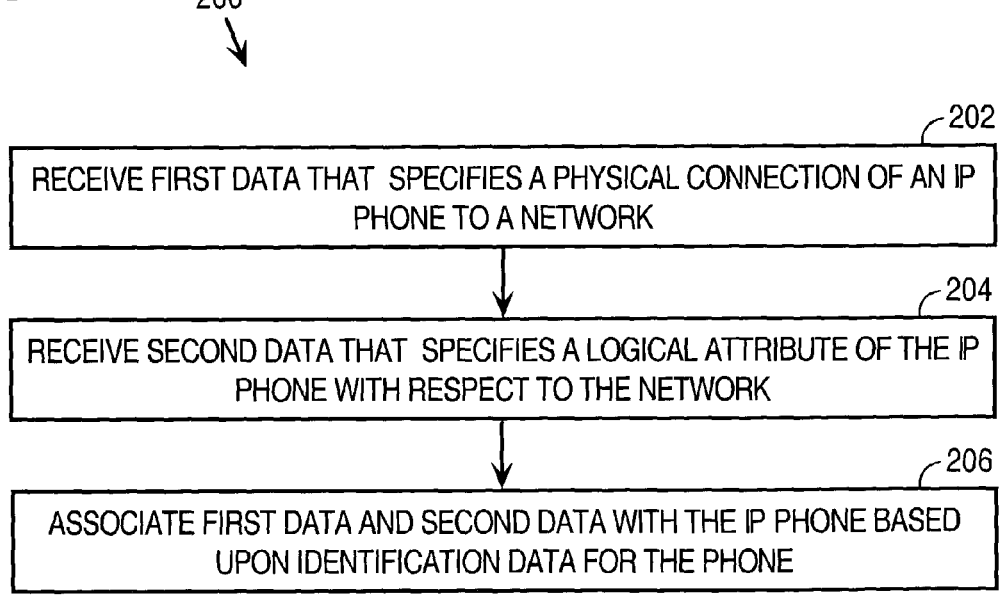
FIG. 2 is a flow diagram that depicts an approach for managing IP telephony devices in a network.

FIG. 2 is a flow diagram 200 that depicts an approach for managing IP telephony devices in a network according to an embodiment. In step 202, network manager 124 receives first data that specifies a physical connection of IP phone 112 to network 102. The first data may specify any attributes of the physical connection of IP phone 112 to network 102, depending upon the requirements of a particular application. For example, the first data may specify an address or port to which IP phone 112 is connected. The first data may be automatically generated and provided to network manager 124 by network switch 104. Alternatively, network manager 124 may query network switch 104 for the first data, for example, using Cisco Systems' Call Discovery Protocol (CDP). In some applications, network manager 124 may query a bridge table to obtain the connection information. This may involve obtaining a list of Virtual Local Area Networks (VLANs) and mapping data to identify the port to which a particular IP phone is connected.

In step 204, network manager 124 receives second data that specifies one or more logical attributes of IP phone 112 with respect to network 102. The second data may specify and logical attributes of IP phone 112, depending upon the requirements of a particular application. For example, the second data may specify an extension of IP phone 112 on network 102 or an IP address of IP phone 112. The second data may be automatically generated and provided by call manager 122 to network manager 124. Alternatively, network manager 124 may query call manager 122 for the second data.

In step 206, network manager 124 associates the first data and the second data with IP phone 112 based upon identification data that identifies IP phone 112. That is, network manager 124 associates the logical attributes and the physical connection data with IP phone 112, based upon the identification data for IP phone 112.

II. Administrative Applications

The use of identification data allows network manager 124 to unambiguously associate logical and physical data with the correct IP phone. This is particularly advantageous in several situations. For example, this approach allows network manager 124 to present both the logical and physical data for an IP phone on a Graphical User Interface (GUI) and guarantee to administrative personnel that the logical and physical data are correct for the IP phone. This provides greater assurance to administrative personnel that particular logical and physical data belong to a particular IP phone.

One application of the aforementioned approach is in the context of performing audits of IP telephony devices on a network. In this situation, network manager 124 receives and associates logical and physical data for an inventory of IP telephony devices on network 102. More specifically, network manager 124 receives logical data for IP phones 110, 112, 114 from call manager 122 and physical data for IP phones 110, 112, 114 from network switches 104, 106, 108. In this situation, network manager 124 would receive physical data from network switch 106 that indicates that there are no IP telephony devices currently connected to network switch 106.

Another application of the aforementioned approach is for reconciling additions, deletions and connection changes of IP telephone devices in a network. For example, when a new IP phone is added to network 102, network manager 124 receives logical and physical data for the new IP phone. Network switches may be configured to automatically generate and provide physical data to network manager 124 in response to connection changes. Alternatively, network manager 124 may receive the physical data for the new IP phone in response to network manager 124 polling network switches 104, 106, 108 for physical data.

Changes to logical data are typically made by network administrative personnel through a call manager 122 GUI. For example, network administrative personnel may use a call manager 122 GUI to add or delete an IP phone from network 102, or to change a logical attribute of an IP phone, such as an extension number. In response to the changes in logical data, call manager 122 may automatically provide updated logical data to network manager 124. Alternatively, network manager 124 may periodically query call manager 122 for updates to logical data.

III. Authentication and Security

The approach described herein for managing IP telephony devices in a network is useful for identifying suspect IP telephony devices. Suppose that IP phone 114 is an illegal IP phone created by a third party. Suppose further that the third party steals the MAC address of IP phone 112 and configures IP phone 114 with this MAC address in an attempt to "spoof" IP phone 112. By spoofing IP phone 112 with IP phone 114, the third party may be able to make telephone calls using IP phone 114 and have the calls appear to call manager 122 to have been made using IP phone 112.

According to one embodiment, network manager 124 is configured to centrally manage both physical and logical data for IP phones 110, 112, 114, and to identify as suspect, IP phones for which physical data is available, but for which no corresponding logical data is available. In the present example, IP phone 114 is physically connected to network 102 via network switch 108. Thus, network manager 124 has access to physical data for IP phone 114 from network switch 108. In the present situation, however, IP phone 114 has not been registered with call manager 122 since the third party wishes to have calls made using IP phone 114 attributed to IP phone 112. Thus, there is no separate logical data available for IP phone 114. Based upon the absence of logical data for IP phone 114, network manager 124 determines that IP phone 114 is a suspect phone and takes appropriate action, such as notifying administrative personnel that IP phone 114 is a suspect phone.

FIG. 3 is a flow diagram 300 that depicts an approach for identifying suspect IP telephony devices using IP device identification data, according to an embodiment. In step 302, first data is received that specifies the physical connections for a set of IP telephony devices on a network. For example, in FIG. 1, network manager 124 receives first data that specifies the physical connections of IP phones 110, 112, 114 to network switches 104, 108 in network 102.

In step 304, second data is received that specifies attributes for the set of IP telephony devices with respect to the network. For example, in FIG. 1, network manager 124 receives second data that specifies logical attributes of IP phones 110, 112, 114 with respect to network 102, such as phone extensions.

In step 306, IP telephony devices are identified that have connections to the network, as indicated by the first data, but which do not have any logical attributes specified in the second data. Network manager 124 determines whether IP phones 110, 112, 114, which each has connection attributes specified in the first data, do not have logical attributes specified in the second data. IP telephony devices that have connections specified in the first data, but which do not have any logical attributes specified in the second data are suspect IP telephony devices. In the present example, network manager 124 has physical data from network switch 108, but no logical data from call manager 122, since IP phone 114 has not been registered with call manager 122.

In step 308, suspect IP telephony devices are investigated. The particular actions taken may vary depending upon the requirements of a particular application and the invention is not limited to any particular steps. For example, network manager 124 may notify administrative personnel that IP phone 114 is a suspect phone on the basis that there is physical data available for IP phone 114, but no logical data.

According to one embodiment, network manager 124 is configured to identify, as suspect phones, IP phones that have the same identification data, e.g., the same MAC address. In the present example, network manager 124 is configured to compare the MAC addresses of IP phones 110, 112, 114. The result of this comparison is that network manager 124 determines that IP phones 112, 114 have the same MAC address and are therefore are characterized as suspect phones.

According to one embodiment, having determined IP phones 112, 114 to be suspect devices, network manager 124 is further configured to determine whether there is logical data available for any of the suspect devices. Those IP phones that do have logical data available are declassified as suspect devices. In the present example, network manager 124 has identified IP phones 112, 114 as suspect IP phones since they have the same MAC address. According to this embodiment, network manager 124 determines that logical data is available for IP phone 112 since IP phone 112 was registered with call manager 122. Accordingly, network manager 124 declassifies IP phone 112 as a suspect device, leaving IP phone 114 as the only suspect device. After identifying suspect devices using the aforementioned approach, network manager 124 may notify administrative personnel accordingly.

FIG. 4 is a flow diagram 400 that depicts an approach for identifying suspect IP telephony devices using IP device identification data, according to another embodiment. In step 402, the identification data is received for IP phones 110, 112, 114. In the present example, the identification data for an IP phone is a MAC address.

In step 404, IP telephony devices that have the same identification data are identified as suspect devices. In the present example, network manager 124 compares the MAC addresses of IP phones 110, 112, 114 and determines that IP phones 112, 114 have the same MAC address and therefore are suspect IP phones. In some cases, certain identification data alone is not sufficient to determine whether duplicate devices are present in the network; for example, one IP phone may have more than one extension, or there may be multiple devices that interface with a single network interface card ("NIC"). For such cases, step 404 may involve comparing a combination of attributes, such as MAC address, switch address, and switch port, to resolve whether a duplicate device is present.

In step 406, data is received that specifies logical attributes for the set of IP telephony devices with respect to the network. In the present example, network manager 124 receives second data from call manager 122 that specifies logical attributes of IP phones 110, 112, 114 with respect to network 102, such as phone extensions. Network manager 124 determines whether the data includes logical data for any of the suspect IP telephony devices determined in step 404. Those devices that have logical data available are declassified as suspect devices. In the present example, the received data includes data that specifies logical attributes of IP phone 112, since IP phone 112 had previously registered with call manager 122. Accordingly, IP phone 112 is declassified as a suspect device.

In step 408, suspect IP telephony devices are optionally investigated and/or administrative personnel are notified. The particular action taken may vary depending upon the requirements of a particular application and the invention is not limited to any particular steps. For example, for IP telephony devices identified in step 404 that do not have any logical attributes specified in the data received in step 406, network manager 124 may notify administrative personnel, since it is known whether the identified IP telephony devices simply have not yet been registered with call manager 122, or whether the identified IP telephony devices are indeed possible suspect devices.

IV. Implementation Mechanisms

The approach described herein for tracking IP telephony devices is applicable to a variety of contexts and implementations and the invention is not limited to any particular context or implementation. For example, the approach may be implemented as a stand-alone mechanism or integrated into a network management application.

Network manager 124 has been described herein primarily in the context of a mechanism that is disposed external to network 102. The invention is not limited to this context and network manager 124 may be implemented internal to network 102 as a stand-alone network component, or integrated into another network component, such as a switch, router, hub or gateway.

For purposes of explanation, the functionality of network manager 124 has been depicted in the figures and described as being separate from call manager 122 and network 102, although this is not a requirement of the invention. For example, the functionality of network manager 124 may be integrated into call manager 122 or other elements of network 102, depending upon the requirements of a particular application. Furthermore, embodiments many be implemented in computer hardware, computer software, or a combination of computer hardware and software and the invention is not limited to any particular computer hardware or software configuration.

Although described herein primarily in the context of managing IP phones that are identified using MAC layer addresses, the approach is applicable to any type of IP telephony device and any device identification data. Examples of other types of IP telephony devices include, without limitation, Personal Digital Assistants (PDAs), laptop computers, videophones and other mobile devices.

Figure 5:
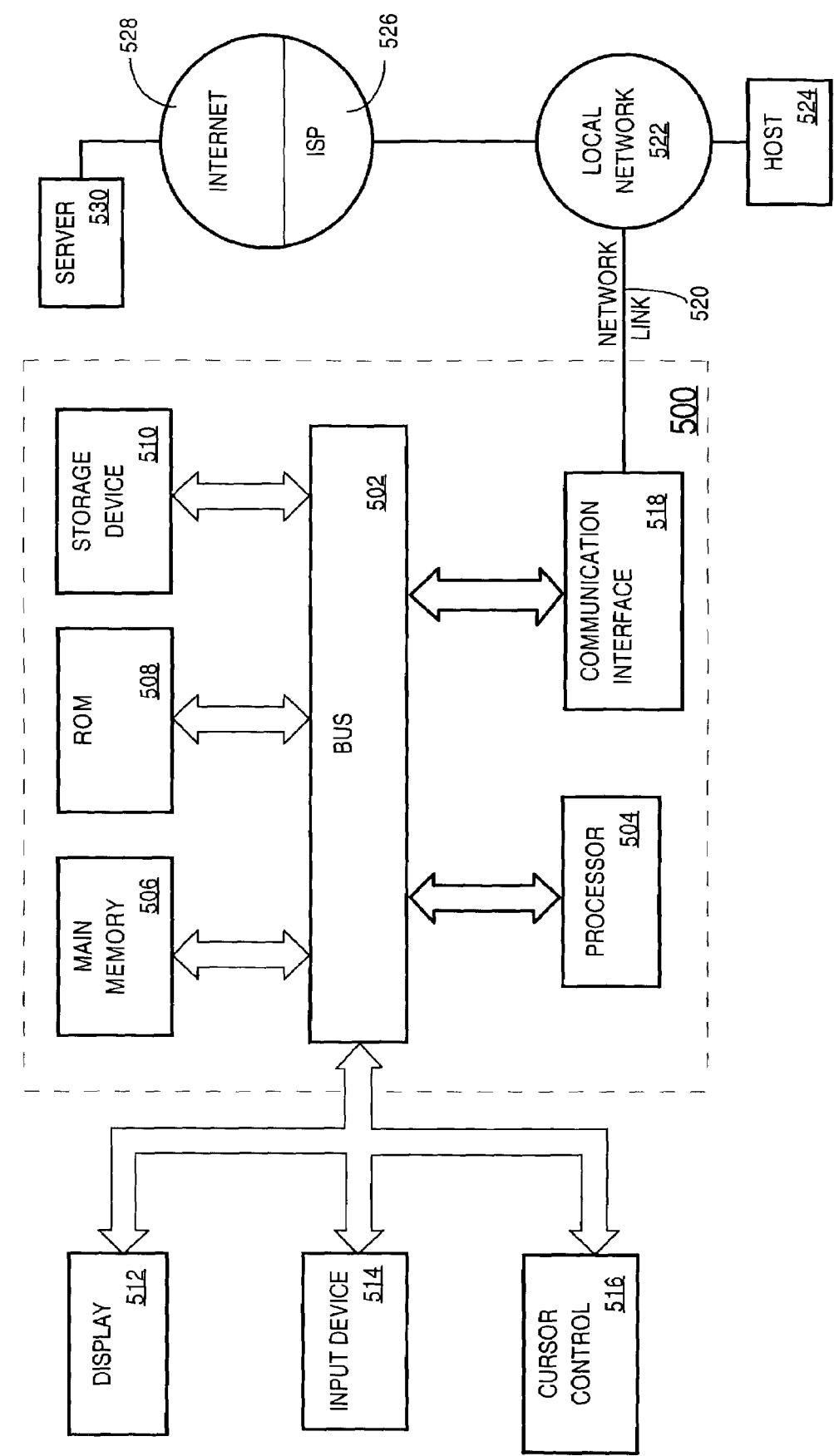
FIG. 5 is a block diagram that depicts a computer system on which embodiments of the present invention may be implemented.

FIG. 5 is a block diagram that illustrates a computer system 500 upon which an embodiment may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for managing IP telephony devices in a network. According to one embodiment, managing IP telephony devices in a network is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hardwired circuitry may be used in place of or in combination with software instructions to implement the invention. Thus, embodiments are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the Internet 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for managing IP telephony devices in a network as described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for identifying a suspect Internet Protocol (IP) telephony device on a communications network comprising the computer-implemented steps of:
   comparing first identification data that identifies a first IP telephony device on the communications network to second identification data that identifies a second IP telephony device on the communications network, and
   if the first identification data is the same as the second identification data, then generating first status data that indicates that the first and second IP telephony devices are suspect devices; and
   if second data that specifies a logical attribute of the first IP telephony device with respect to the communications network is not available, then generating second status data that indicates that the first IP telephony device is a greater suspect device than the second IP telephony device.

2. The method as recited in claim 1, further comprising if third data that specifies a logical attribute of the second IP telephony device with respect to the communications network is available, then generating third status data that indicates that the second IP telephony device is not a suspect device.

3. A computer-readable medium for identifying a suspect Internet Protocol (IP) telephony device on a communications network, the computer-readable medium carrying one or more sequences of instructions which, when executed by one or more processors, cause the one or more processors to perform the steps of:
   comparing first identification data that identifies a first IP telephony device on the communications network to second identification data that identifies a second IP telephony device on the communications network, and
   if the first identification data is the same as the second identification data, then generating status data that indicates that the first and second IP telephony devices are suspect devices; and
   if second data that specifies a logical attribute of the first IP telephony device with respect to the communications network is not available, then generating second status data that indicates that the first IP telephony device is a greater suspect device than the second IP telephony device.

4. The computer-readable medium as recited in claim 3, further comprising if third data that specifies a logical attribute of the second IP telephony device with respect to the communications network is available, then generating third status data that indicates that the first IP telephony device is not a suspect device.

5. A computer system for identifying a suspect Internet Protocol (IP) telephony device on a communications network, the computer system comprising a memory storing instructions which, when processed by one or more processors, cause:
 comparing first identification data that identifies a first IP telephony device on the communications network to second identification data that identifies a second IP telephony device on the communications network, and
 if the first identification data is the same as the second identification data, then generating status data that indicates that the first and second IP telephony devices are suspect devices; and
 if second data that specifies a logical attribute of the first IP telephony device with respect to the communications network is not available, then generating second status data that indicates that the first IP telephony device is a greater suspect device than the second IP telephony device.

6. The computer system as recited in claim 5, wherein the memory stores additional instructions which, when processed by the one or more processors, causes if third data that specifies a logical attribute of the second IP telephony device with respect to the communications network is available, then generating third status data that indicates that the second IP telephony device is not a suspect device.

7. An apparatus for identifying a suspect Internet Protocol (IP) telephony device on a communications network, the apparatus comprising:
 means for comparing first identification data that identifies a first IP telephony device on the communications network to second identification data that identifies a second IP telephony device on the communications network, and
 means for if the first identification data is the same as the second identification data, then generating status data that indicates that the first and second IP telephony devices are suspect devices; and
 means for if second data that specifies a logical attribute of the first IP telephony device with respect to the communications network is not available, then generating second status data that indicates that the first IP telephony device is a greater suspect device than the second IP telephony device.

8. The apparatus as recited in claim 7, further comprising means for if third data that specifies a logical attribute of the second IP telephony device with respect to the communications network is available, then generating third status data that indicates that the second IP telephony device is not a suspect device.

9. The method as recited in claim 1, wherein the first identification data is a media access control layer address of the first IP telephony device.

10. The method as recited in claim 1, wherein the first identification data is a code that uniquely identifies the first IP telephony device.

11. The method as recited in claim 1, wherein the first identification data is a signature that uniquely identifies the first IP telephony device.

12. The method as recited in claim 1, wherein the logical attribute of the first IP telephony device is a telephone extension of the first IP telephony device.

13. The method as recited in claim 1, wherein the logical attribute of the first IP telephony device is an Internet Protocol address of the first IP telephony device.

14. The computer-readable medium as recited in claim 3, wherein the first identification data is a media access control layer address of the first IP telephony device.

15. The computer-readable medium as recited in claim 3, wherein the first identification data is a code that uniquely identifies the first IP telephony device.

16. The computer-readable medium as recited in claim 3, wherein the first identification data is a signature that uniquely identifies the first IP telephony device.

17. The computer-readable medium as recited in claim 3, wherein the logical attribute of the first IP telephony device is a telephone extension of the first IP telephony device.

18. The computer-readable medium as recited in claim 3, wherein the logical attribute of the first IP telephony device is an Internet Protocol address of the first IP telephony device.

19. The computer system as recited in claim 5, wherein the first identification data is a media access control layer address of the first IP telephony device.

20. The computer system as recited in claim 5, wherein the first identification data is a code that uniquely identifies the first IP telephony device.

21. The computer system as recited in claim 5, wherein the first identification data is a signature that uniquely identifies the first IP telephony device.

22. The computer system as recited in claim 5, wherein the logical attribute of the first IP telephony device is a telephone extension of the first IP telephony device.

23. The computer system as recited in claim 5, wherein the logical attribute of the first IP telephony device is an Internet Protocol address of the first IP telephony device.

24. The apparatus as recited in claim 7, wherein the first identification data is a media access control layer address of the first IP telephony device.

25. The apparatus as recited in claim 7, wherein the first identification data is a code that uniquely identifies the first IP telephony device.

26. The apparatus as recited in claim 7, wherein the first identification data is a signature that uniquely identifies the first IP telephony device.

27. The apparatus as recited in claim 7, wherein the logical attribute of the first IP telephony device is a telephone extension of the first IP telephony device.

28. The apparatus as recited in claim 7, wherein the logical attribute of the first IP telephony device is an Internet Protocol address of the first IP telephony device.

* * * * *